United States Patent [19]

Schade

[11] 4,023,117

[45] May 10, 1977

[54] STIMULATED RAMAN SCATTERING RESONATOR

[75] Inventor: William J. Schade, San Diego, Calif.

[73] Assignee: The United States of America as represented by the Secretary of the Navy, Washington, D.C.

[22] Filed: Feb. 3, 1976

[21] Appl. No.: 654,824

[52] U.S. Cl. .......................................... 331/94.5 N
[51] Int. Cl.² .......................................... H01S 3/10
[58] Field of Search ................... 331/94.5; 330/4.3; 307/88.3

[56] References Cited

UNITED STATES PATENTS 3,435,373  3/1969  Wolff ............................ 331/94.5 N Primary Examiner—William L. Sikes
Attorney, Agent, or Firm—R. S. Sciascia; G. J. Rubens; T. M. Phillips

[57] ABSTRACT

A stimulated Raman scattering resonator which generates stimulated Raman scattering within an optical resonator and provides regeneration and unidirectional emission of radiation. A focusing mirror is provided for the pumping radiation and is combined with the stimulated Raman scattering resonator within a single optical structure. A semi-confocal type resonator having one totally reflecting plain mirror and one partially reflecting spherical mirror is employed to increase pumping irradiance.

6 Claims, 2 Drawing Figures

STIMULATED RAMAN SCATTERING RESONATOR

BACKGROUND OF THE INVENTION

Stimulated Raman scattering processes have been applied recently in the development of tunable spin-flip Raman lasers such as disclosed by A. C. K. N. Patel and E. D. Shaw, Physical Review B3, 1279 (1971). Typically, previous devices consisted of focusing the optical pumping radiation from either a carbon monoxide laser at $5\mu m$ wavelengths or a carbon dioxide laser at $10\mu m$ wavelengths into a crystal of indium antimonide (InSb) which is held in a cryostat at a temperature of about $T = 1°$ to $30°$ K; a variable magnetic field is applied to the indium antimonide crystal to produce and change the frequency of the spin-flip Raman laser output. The Raman scattering material which may be indium antimonide crystals shaped as a parallelepiped with dimensions of a few millimeters along each edge. At least two opposite sides are polished planes and parallel to form a Fabry-Perot type optical resonator. Generally, the polished sides are chosen to be those through which the pumping radiation enters and leaves the crystal.

Devices constructed in this manner suffer from the disadvantages that the pumping source, such as the beam from a CO or CO2 laser, must be focused to a small spot to achieve sufficiently high irradiance in the scattering material to exceed the threshold for stimulated Raman scattering. The irradiance is limited by the focal length of the lens or mirror which is determined by the minimum distance that it can be positioned from the scattering material. Generally the focusing optic must be several centimeters. Also the resonators are constructed with uncoated external surfaces to provide a reflectance of 35%. The incident pumping radiation is thereby reduced 35% by this reflectance at the entrance surface after traversing the length of the scattering material, the internal irradiance is further reduced 65% by transmission through the exit surface. The internal irradiance is distributed throughout the volume of the plane-parallel resonator because of multiple reflections of the boundary surfaces. Each of these conditions effects a reduction in the internal irradiance which requires higher incident power in the pumping beam to exceed the threshold for stimulated Raman scattering. The plane-parallel type resonator also is extremely susceptible to high radiation losses because of misalignment of the end surfaces and defraction of the resonant wave front.

SUMMARY OF THE INVENTION

The present invention provides for a scattering resonator which combines the functions of a focusing mirror for the pumping radiation and a stimulated Raman scattering resonator into a single optical device. The present invention provides for a device that will generate stimulated Raman scattering within an optical resonator resulting in regeneration and unidirectional emission of the stimulated radiation. This is provided by focusing the optical pump irradiance to a minimum spot size within the Raman scattering crystal or material; containing the optical pump irradiance within the resonant structure; radiating the stimulated Raman scattering into the forward direction, i.e., eliminate the back scattering loss; and regenerating the stimulated Raman scattering through the focused optical pump irradiance.

Accordingly, an object of the invention is the provision of an improved stimulated Raman scattering resonator.

Another object of the invention is the provision for increased pumping irradiance by total reflection at the focusing mirror at the end of the scattering cell.

A further object is for the provision of increased pumping irradiance at the focus of the spherical mirror because of close proximity to the stimulated Raman scattering resonator.

Still another object is the provision for increased pumping irradiance within the stimulated Raman scattering resonator by total reflection of plain mirror at the focus of the spherical mirror.

Another object of the invention is the confinement of stimulated Raman scattering to mode a volume of the semi-confocal resonator, with mode selective properties.

Another object of the invention is the elimination of back scattering loss of the stimulated Raman scattering.

Another object of the invention is the provision of unidirectional output coupling through one (forward) end of the stimulated Raman scattering resonator.

Another object of the invention is the provision for minimal propagation of optical pumping radiation out of the stimulated Raman scattering resonator into forward direction.

Other objects and many of the attendant advantages of this invention will be readily appreciated as the same becomes better understood by reference to the following detailed description when considered in connection with the accompanying drawings.

BRIEF DESCRIPTION OF THE INVENTION

DESCRIPTION OF THE PREFERRED EMBODIMENTS

Figure 1:
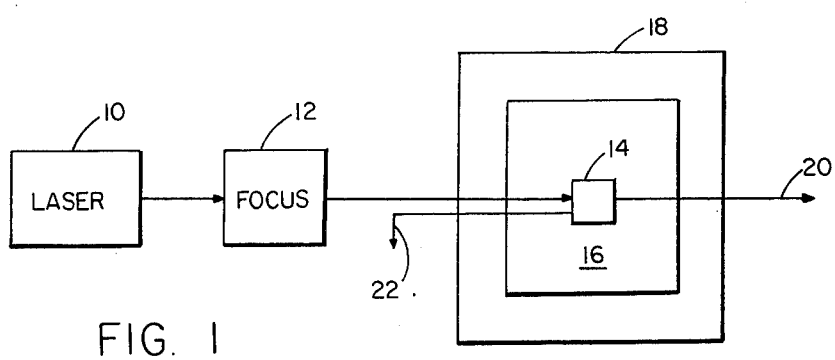
FIG. 1 is an overall block diagram showing the relationship of the present invention to the prior art.

Referring now to FIG. 1 wherein there is shown an optical pumping source 10 such as a CO or CO2 laser which provides a laser beam that is focused by an optical focusing element 12. Focusing element 12 may be a lens or spherical mirror to achieve high photon density or irradiance (watts/cm$^2$) in the Raman scattering resonator 14. The Raman scattering material for resonator 14 may be InSb crystal shaped in the manner described below. Resonator 14 is positioned in a low temperature cryostat 16 filled with liquid helium and surrounded by an electro magnet 18 for generating a variable magnetic field. The output is a tunable laser radiation beam represented by the arrow 20. Backscatter radiation loss is indicated by arrow 22.

Figure 2:
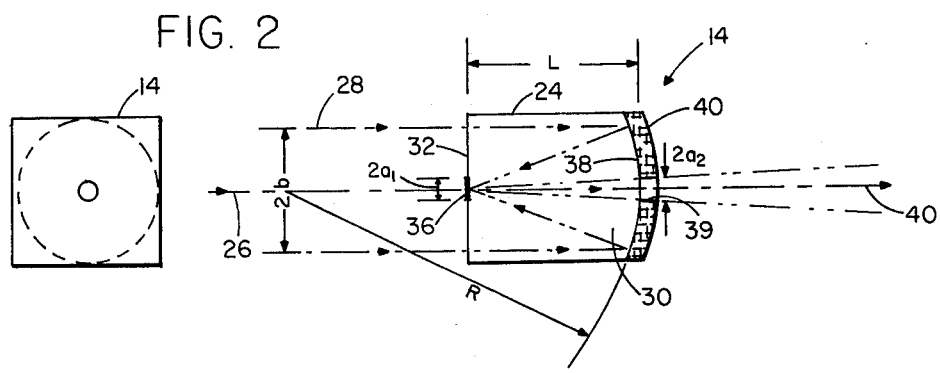
FIG. 2 is a sectional view of the scattering resonator of FIG. 1.

Referring now to FIG. 2 wherein there is shown in detail the resonator 14 of FIG. 1. The specific size and shape of the resonator 14 is determined by the Raman scattering material which may be a gas, liquid, or solid, the pumping wavelength $\lambda_p$ and the particular application. In the embodiment shown, the side walls 24 are parallel to the optic axis 26 and may be cylindrical or plain. The dimensions $a_1$, $a_2$, $b$, $L$ and $R$ will be determined by the specific application. A laser beam 28 with diameter $2b$, which contains approximately 90% of the incident power, is directed along the optic axis 26 into the scattering cell 30 through plane entrance surface 32 which has an anti-reflection coating for $\lambda_p$, except for a central obstruction 36 with diameter $2a_1$. For total reflection of the internal radiation, obstruction 36 should preferably be made of gold. The pumping radiation is focused by spherical mirror 38 with a radius of curvature $R = 2L$. Mirror 38 is made totally reflecting by means of a gold coating 40 except for the central diameter $2a_2$ where it is partially transmitting for the stimulated Raman scattering resonator. The focused pump radiation from mirror 38 is reflected back into the scattering cell by plain mirror 36 which doubles the irradiance within the resonator. The maximum gain distribution is localized within the resonator along the optic axis 26 by the action of the focused pump irradiance.

Resonator 14 then is a semi-confocal type consisting of plain mirror 36 at one end and a spherical mirror 38 at the opposite end of the structure containing the Raman scattering material. As described above plain mirror 36 is totally reflecting with diameter $2a_1$ which is determined by the allowable diffraction losses through the Fresnel number $N = a_1{}^2/\lambda L$, where $\lambda$ is the wavelength in the medium between the mirrors and L is the separation between the mirrors along the optic axis 26.

The spherical mirror for the resonator 14 is the partially reflecting central portion 39 of the focusing mirror 38 with radius of curvature $R = 2L$. It is through this partially reflecting portion 39 where the resonant radiation 40 emerges. The amount of radiation passing through partially reflecting central portion 39 is determined by the diffraction losses $N = a_2{}^2/\lambda L$.

By way of example, and with InSb as the Raman scattering material, the shape of resonator 14 can be a cube measuring 6 millimeters long each edge. The side walls 24 can be rough ground. The entrance surface 32 is a polished plane and coated with zinc sulfide or zinc selenide, an anti-reflection material, for the chosen $\lambda_p$ (as for example 5$\mu$m for CO or 10 micron for $CO_2$ lasers). The opposite end of the cube is ground and polished as a spherical mirror 38 of radius $R=2L=12$mm which is coated with gold 40 except for the central diameter $2a_2$, 39, which is uncoated for a reflectance of 35% at $\lambda_p = 5\mu$m or 10$\mu$m. The diameter $2a_2$ for partially reflecting output mirror 39 is determined from the defraction losses using the formula, $N = a_2{}^2/\lambda L$. The defraction loss is less than 0.1% per transit for the lowest order mode in a semi-confocal resonator with a Fresnel number $N = 2$. Then, $a_2{}^2 = 2\lambda L = 12\lambda$, $\lambda = \lambda_o/n$ where $\lambda_o$ is the wavelength in vacuum and $n = 4$ is the refractive index for InSb; with CO $= 5\mu$m, $a_2 = 0.122$mm $= 122$ micrometers; with $\lambda_o = 10\mu$m, $a2 = 0.173$mm $= 173\mu$m.

The plain gold mirror 36 is coated on the entrance surface so that the optic axis 26 passes through the center and is positioned so that the optic axis passes through the center of semi-reflecting mirror 38. The diameter $2a_1$ is chosen to minimize the obstruction of the incident laser beam 28 and avoid excessive defraction losses; from the above example and calculation for $a_2$, 0.25mm $<2a_1<$ 0.35mm.

For infrared scattering materials, the optical resonator could be made of silicon, germanium, or gallium arsenide. Small platelets of the Raman scattering material can be attached to the center of the plane entrance surface and function as the plane central reflector with the outer surface coated for total reflection. This is especially useful for materials such as Pb SnTe or Hg Cd Te which have limited optical quality and homogenity, but they would be effective in a spin-flip Raman laser pumped with 10$\mu$m radiation from a CO2 laser.

For liquid or gaseous Raman scattering materials, the side walls can be cylindrical glass or metal tubing with suitable windows and mirrors attached to each end of the tube. Other more complicated symmetrical shapes can be applied to the entrance and exit surfaces for internal focusing along the optical axis.

Obviously many modifications and variations of the present invention are possible in the light of the above teachings. It is therefore to be understood that within the scope of the appended claims the invention may be practiced otherwise than as specifically described.

What is claimed is:

1. A stimulated Raman scattering resonator comprising:
   a. Raman scattering means for receiving optical pump irradiance,
   b. reflecting means contiguous with one surface of said scattering means,
   c. focusing means contiguous with another surface of said scattering means for focusing said optical pump irradiance onto said reflecting means,
   d. said focusing means having a partially transmitting portion through which substantially all of said stimulated Raman scattering passes when reflected by said reflecting means.

2. A stimulated Raman scattering resonator comprising:
   a. Raman scattering means for receiving optical pump irradiance,
   b. optical reflecting means contiguous with one surface of said scattering means for focusing the optical pump irradiance to a minimum spot size on another surface of the Raman scattering means,
   c. and means at said spot for radiating said focused irradiance and re-reflecting the stimulated Raman scattering in the forward direction.

3. The resonator of claim 2 wherein said radiating means is a substantially totlly reflecting plain surface.

4. The resonator of claim 3 wherein said optical reflecting means is a focusing mirror.

5. The resonator of claim 2 wherein said scattering means is an InSb crystal.

6. The resonator of claim 5 wherein said focusing mirror has a partially transmitting portion through which said stimulated Raman radiation can exit in the forward direction from said crystal.

* * * * *